The United States Patent Office 3,211,567
Patented Oct. 12, 1965

3,211,567
ORGANICALLY MODIFIED MAGNESIAS
Richard A. Patton, Arlington Heights, Ill., assignor to Morton Salt Company, Chicago, Ill., a corporation of Delaware
No Drawing. Filed Apr. 10, 1962, Ser. No. 186,367
11 Claims. (Cl. 106—308)

This invention relates to novel magnesium oxide compositions and more specifically to organically modified magnesias, and to methods of producing the same.

The products of the present invention have utility as reinforcing fillers in a variety of organic polymeric and elastomeric materials. They are more compatible with organic materials than the unmodified magnesia and therefore lend themselves to ease of incorporation into organics. In some instances, certain organic amino compounds used in the modification of magnesias result in a product which has a dual function in elastomer processing, namely as a filler and as an accelerator or curing aid. This latter class of organically modified magnesias has properties which produce results that differ substantially from those obtained by the use of the components per se.

Magnesium oxide, or more conventionally magnesia, is a well known commodity of commerce. Magnesia may be prepared from a number of natural minerals. Magnesite (magnesium carbonate) may be calcined directly to magnesia. When this is done, a high density magnesium oxide of coarse particle size results. Brucite, naturally occurring magnesium hydroxide, may also be calcined directly to magnesium oxide. Once again high density, coarse particle magnesium oxide results. Dolomite, because of the presence of calcium oxide, requires treatment to separate the alkaline oxides after calcining. This may be done by treatment of the quicklime with carbon dioxide to solubilize the magnesium component as the bicarbonate. Filtration and washing will then produce a liquor which may, by heat, be decomposed to a basic carbonate. The basic carbonate may then be calcined to magnesium oxide. This is the process that has been employed to produce insulating magnesia.

The production of magnesium oxide made from sea water or brine involves the lime treatment of the magnesium ion containing solution. For example, the calcium oxide component of the calcined dolomite (dolomitic lime) will react with soluble magnesium chloride to produce insoluble magnesium hydroxide and soluble calcium chloride. While it is possible to produce a high surface area of magnesia from naturally occurring materials, the highest surface areas and the most reactive magnesias are produced by calcination of precipitated fine particles of magnesium carbonate or magnesium hydroxide. For purposes of this invention any active magnesia, regardless of origin, is a suitable starting material. It is preferred, however, to employ the finer particle size precipitated materials.

If the calcination step is carried out at more moderate temperatures, the product produced is less crystalline and more amorphous in character than periclase. This magnesia may be used in a variety of industrial applications, such as a curing aid for elastomers, the manufacture of cements, metal coatings and other well known uses. The product may be characterized as a lightly calcined magnesia.

It has been found that many of the lightly calcined magnesias of commerce have unusual properties which are not common to that hard calcined periclase or the starting materials from which magnesias are prepared, namely the hydroxide or the carbonate. One characteristic of these lightly calcined magnesias is the ability to adsorb iodine.

It has been found that magnesias having an iodine adsorption value of from 10 to about 300 milligrams per gram are capable of reacting with certain broad classes of organic compounds to produce an organically modified magnesia. The reactivity of these magnesias is highly unexpected in view of the fact that the starting materials, such as magnesium hydroxide, are unreactive with respect to these organic compounds. Magnesias having an iodine number below 10, such as periclase, are also unreactive.

Inasmuch as magnesia as such is often used in conjunction with organic or hydrocarbon derived materials, it would be desirable, if a product could be produced which would modify the purely inorganic characteristics of magnesia, to produce a material which is more compatible with organic compositions.

Accordingly, in one broad form, the compositions of the present invention are prepared by a process comprising contacting a lightly calcined magnesium oxide or magnesia having an iodine adsorption number of from about 10 to 300 with an organic amino compound containing up to 20 carbon atoms.

The magnesia starting material is a commercially available product which is sold under a variety of trade names. Magnesium carbonate derived magnesias are sold by the Morton Chemical Company as the 57 series A through G. The magnesium hydroxide derived magnesias are sold under the trade name Elastomag.

As indicated in the foregoing, the magnesia starting materials of the present invention have an iodine adsorption number or value of from about 10 to about 300 milligrams of iodine per gram of dry magnesium oxide, and in the most preferred instance have an iodine number of from about 15 to about 220. The iodine number as referred to herein is determined by the following procedure:

METHOD OF IODINE NUMBER DETERMINATION (1) Weigh a 2 gram sample of magnesium oxide to the nearest milligram.

(2) Transfer to a clear, dry, 200 ml. glass-stoppered bottle.

(3) Add $100 \pm 0.2$ ml. of 0.100 N iodine in carbon tetrachloride, free from traces of sulfur or carbon disulfide.

(4) Stopper the bottle and shake vigorously at ambient temperature in a suitable shaking device for 30 minutes (the test is relatively insensitive to temperature so that no temperature controls are employed).

(5) Allow to settle for 5 minutes and then pipette a 20 ml. aliquot of the clear solution into a 250 ml. Erlenmeyer flask containing 50 ml. of 0.03 N potassium iodide in 75 percent ethanol.

(6) Titrate the 20 ml. aliquot with standard 0.05 N sodium thiosulfate. The sodium thiosulfate should be standardized at least once every two weeks against a standard potassium iodate solution. A sharp end point is obtained without the use of starch indicator.

(7) Calculate iodine number in terms of milligrams of iodine per gram of sample according to the following equation:

$$(V_2 - V_1) \frac{127 \times N_1}{0.4} = \text{mg. l/g.} = \text{iodine number}$$

where $V_2$ is the volume of thiosulfate equivalent to 20 ml. of the original iodine solution—before adsorption of iodine by the oxide; where $V_1$ is the volume of thiosulfate required by the 20 ml. aliquot after the adsorption; and $N_1$ is the normality of the thiosulfate solution.

Broadly the class of amino compounds useful in the process of the present invention includes alkyl amines, alkenyl amines, cycloalkyl amines, aryl amines, aralkyl amines, pyridines, triazines, quinolines, guanidines and urea.

Exemplary of alkyl and alkenyl amines are di-n-propylamine, n-butylamine, di-n-amylamine, 2-ethylhexylamine, dodecylamine, allylamine, hexenylamine, 2-ethylhexylamine, and polyfunctional amines, such as ethylenediamine, triethylenetetraamine, hexamethylenediamine, and diethylenetriamine.

Exemplary of aryl and aralkyl amines are diphenylamine, phenylenediamine, aniline, phenyl-$\alpha$-naphthylamine, benzylamine, dibenzylamine, phenethylamine, di-o-tolylamine, and the like.

Exemplary of guanidines are guanidine, diphenylguanidine, di-o-tolylguanidine.

Typical cycloalkyl amines include cyclohexylamine, cyclopentylamine and methylcyclopentylamine.

Pyridines as a class of reactive materials include compounds such as pyridine, $\beta$-chloropyridine, $\alpha$- or $\beta$-methyl pyridine (also termed $\alpha$- or $\beta$-picolines) and hexahydropyridine (also called piperidine).

Triazine compounds, particularly symmetrical triazines include 2,4,6-triamino-s-triazine (melamine), $N_2,N_4$-diallyl-2,4,6-triamino-s-triazine (diallyl melamine) and 2,4,6-triethylhexahydro-s-triazine (sold by Naugatuck Division of U.S. Rubber Company under the trade name "Trimene Base"). Quinolines are exemplified by quinoline and isoquinoline.

From the foregoing it may be understood that the amino compounds may be in the form of primary, secondary or tertiary amines and furthermore may contain organic substituents that are the same or different. Thus compounds, such as aryl-alkyl amines are included within the description of operable or equivalent compounds. Likewise the substituted guanidines, such as diphenyl guanidine, may also be considered as aryl amino compounds. It is further noted that the amnio compounds of the present invention are free of reactive groups other than amino.

The products of the present invention may be prepared as indicated above by contacting a lightly calcined magnesia, as above defined, with an organic amino compound of the class previously described. Generally, the reaction takes place at temperatures of from about 0° C. to about 225° C., but is preferably carried out at temperatures of from about 65° C. to about 170° C. If desired, the process may be carried out in conjunction with an inert solvent, such as benzene, toluene, heptane, octane, xylene, carbon tetrachloride, or the like. Non-polar solvents are preferred, or at least less polar than the amine reactant. In some instances an excess of the organic amine reactant may be used as a fluid medium. Refluxing is one convenient method of carrying out the reaction.

The ratio of reactants will of course vary, but generally it is preferred to use an excess of amine in the reaction, and a molar excess of at least 10% over the amount of amino compound sought to be introduced is preferred. It should be understood that larger amounts of amino compound may be used in the process of this invention and the excess unreacted starting material recovered after the reaction is complete.

The reaction time is not critical, and periods of time ranging from about ½ hour to 80 hours may be employed depending on the mode of reaction. Ordinarily the reaction proceeds at a higher rate at the more elevated temperatures. The extent of reaction, that is, the amount of organic amine that may be introduced, varies with the iodine number of the magnesia, the character of the amino compounds both as to reactivity and molecular weight and the physical state of the magnesium oxide (particle size). Generally it has been found that passing the reaction mixture through a colloid mill or homogenizer results in appreciably more reaction and consequently a greater percentage of organic material in the magnesia product. The "wet batch" procedure (reflux or heating in an organic fluid [solvent] medium) usually results in complete reaction in from about ½ to 3 hours.

In some instances water is evolved in the reaction process, and the degree of reaction between the inorganic magnesia substrate and the organic amino compound determined or monitored by observing the water recovered from the reaction mixture. This may be conveniently measured by using inert solvents which azeotrope with water, and recovering the water in a Dean-Stark trap. In some instances the extent of reaction is considerably greater than the water recovered would indicate. This phenomenon is particularly noted in the case of tertiary amines with no replaceable hydrogen atom.

When the reaction is complete, as may be determined in some instances by the cessation of the evolution of water, the reaction product is recovered by filtration and washed with a volatile, inert solvent to remove any excess organic reactant. Solvents for washing may be any inert material substantially of the same type as are used for the reaction medium. After washing, the filter cake is dried, preferably at temperatures of from between about 65 and 100° C., and pulverized into a powder.

The products of the present invention may also be prepared by means of a fluidized bed technique wherein a pulverized lightly calcined magnesium oxide reactant is placed in a fluid bed apparatus and a vaporized organic amine reactant carried into aand through the fluidized bed by the fluidizing gas stream. Excess organic vapors may be stripped from the fluidized magnesium oxide in the same apparatus, if desired. In utilizing fluid bed techniques the magnesium oxide does not need to be separated from solvent, washed or dried, as in the case of the "wet batch" technique. Generally the same temperatures are useful in fluidized bed technique as in the solvent system or "wet batch" technique using a liquid reaction medium. The temperature employed will usually depend upon the boiling point of the amine reactant or its partial pressure in the fluidizing gas system. The broad contact time of the reaction in fluid bed operations carried out at these temperatures is from about ½ to 80 hours, and preferably from 10 to 60 hours. The following specific examples will further illustrate the process for producing the compositions of the present invention.

*Example I*

Into a 3-liter 3-necked flack, equipped with a thermometer, stirrer and reflux condenser with attached Dean-Stark trap, were placed 1.5 liters of benzene (dried over anhydrous $CaSO_4$ initially and then over $P_2O_5$) and 24.5 grams of diphenyl amine. The contents of the flask were heated and agitated until solution was complete. To the resulting solution was added 230 grams of dry lightly calcined magnesium oxide with stirring and the contents of the flask heated to reflux (78–79° C.). The reaction mixture was stirred and heated at reflux. Water of reaction was collected and measured in the Dean-Stark trap during the reaction period. The reaction was considered complete when water was no longer evolved from the reaction mixture. The product was recovered by filtering the mixture through a Buchner funnel with vacuum. The filter cake was washed with hot benzene. The washed filter cake was allowed to air dry for a brief period and then dried in vacum at 65° C. for from 8 to 10 hours. The filtrate was evaporated to dryness and the unreacted diphenyl amine recovered. The following table will illustrate the results from three separate runs.

TABLE I

| Run | A | B | C |
| --- | --- | --- | --- |
| Magnesium oxide activity (Mg.$I_2$/gram MgO)[1] | 140 | 100 | 40 |
| Grams of water recovered | 2.0 | 1.8 | 1.4 |
| Diphenylamine charged, grams | 24.5 | 24.5 | 24.5 |
| Diphenylamine recovered, grams | 20.4 | 17.4 | 16.3 |
| Diphenylamine reacted, grams | 4.1 | 7.1 | 8.2 |
| Reaction time, hours | 0.75 | 1.75 | 1.5 |

[1] Iodine adsorption values in milligrams of iodine per gram of magnesium oxide.

From the foregoing example it may be understood that the amount of organic amino compound reacted is not necessarily directly related to the amount of water recovered in the reaction.

The following table will illustrate the production of organically modified magnesias using organic amino compounds by the method described above.

TABLE II

| Ex. | Magnesium Oxide | | Organic Amino Compound | | Water Evolved grams | | | Reaction Conditions | | | Weight Percent Organic In Product |
|---|---|---|---|---|---|---|---|---|---|---|---|
| | Amount, Grams | Iodine No. | Type | Amount, Grams | Total | Blank | Net | Time (hrs.) | Temp. (° C.) | Solvent | |
| 2 | 230 | 100 | Di-n-propylamine | 15.8 | 2 | | | 2.0 | 80 | Benzene | 2.7 |
| 3 | 230 | 140 | Di-n-propylamine | 14.6 | 2.0 | | | 1.0 | 80 | ___do___ | 1.75 |
| 4 | 230 | 100 | Diallyl melamine | 25.0 | 2.0 | | | 1.5 | 80 | ___do___ | 7.9 |
| 5 | 230 | 170 | Di-o-tolyl guanidine | 21 | 2.3 | 1.7 | 0.6 | 2.0 | 80 | ___do___ | 6.0 |
| 6 | 230 | 20 | Urea | 12.0 | 3.0 | 1.3 | 1.7 | 1.5 | 80 | ___do___ | 4.3 |
| 7 | 230 | 100 | "Trimine base" [1] | 10.6 | 4.8 | 1.4 | 3.4 | 2.0 | 65 | ___do___ | 5.0 |
| 8 | 230 | 150 | Dibenzylamine | 60 | 6.0 | | | 1.75 | 80 | ___do___ | 11.5 |
| 9 | 230 | 170 | Triethylenetetramine | 36.6 | 3.7 | 2.8 | 0.9 | 2.0 | 80 | ___do___ | 5.4 |
| 10 | 230 | 170 | Melamine | 15 | 4.0 | 3.2 | .8 | 2.0 | 117 | Toluene | 6.8 |
| 11 | 230 | 20 | 1,6-hexanediamine | 22.7 | 1.6 | | | 2.0 | 80 | Benzene | 1.5 |
| 12 | 230 | 20 | Ethylenediamine | 24 | 5.4 | 1.3 | 4.1 | 2.0 | 117 | Toluene | 2.0 |
| 13 | 230 | 170 | Phenyl-$\alpha$-naphthylamine | 43.8 | 3.8 | 3.5 | 0.3 | 2.0 | 117 | ___do___ | 3.4 |
| 14 | 230 | 170 | o-Phenylenediamine | 11 | 1.0 | 0.6 | 0.4 | 2.0 | 117 | ___do___ | 4.3 |
| 15 | 230 | 170 | p-Phenylenediamine | 17 | 2.0 | 1.4 | 0.62 | 2.0 | 117 | ___do___ | 3.9 |
| 16 | 230 | 170 | Diamylamine | 15.7 | 2.2 | 1.5 | 0.7 | 2.0 | 117 | ___do___ | 2.7 |
| 17 | 230 | 170 | Pyridine | 1,354 | 0 (sol. in pyridine). | | | 2.0 | 115 | None | 4.0 |
| 18 | 230 | 170 | Aniline | 18.6 | 3.0 | 0 | 3.0 | 2.0 | 80 | Benzene | 1.8 |

[1] 2,4,6-triethylhexahydro-s-triazine.

The organically modified magnesias of this invention may be further characterized as containing from 1 to 25 percent organic material, and preferably from about 2½ to 15 percent organic material. The organic modification of the purely inorganic character of magnesia results in a composition that is more compatible with hydrocarbon derived materials, and particularly suitable as a filler, reinforcing agent or the like in such organic compositions as fuel oil, lubricants, elastomers, polymers, plastics and similar material.

While the foregoing examples illustrate the production of various specific organic amine modified magnesium oxides, it will be understood that other amines of the described classes may also be used. The products as indicated in the foregoing are useful as organically modified fillers in a variety of elastomeric and polymeric products. For example, the hexamethylene diamine-magnesium oxide product prepared from a magnesium oxide of iodine number 20 was useful as a curing agent in a fluorinated elastomer (KX–2141, Minnesota Mining and Manufacturing Co.).

Similarly, diorthotolyl guanidine (DOTG) magnesium oxide reaction products are useful as accelerator-stabilizers when incorporated into rubber stocks. Particular advantage is found in lack of staining characteristics in light rubber stocks, such as white sidewall stocks, which is a common problem when using DOTG alone.

While several particular embodiments of this invention are suggested above, it will be understood of course that the invention is not to be limited thereto since many modifications may be made and it is contemplated therefore by the appended claims to cover any such modifications as fall within the true spirit and scope of this invention.

I claim:

1. A process for preparing an organically modified magnesia containing from about 1 to about 25 percent of organic matter which comprises admixing in a solvent medium at a temperature above about 0° C. a lightly calcined magnesia having an iodine adsorption number of from about 10 to about 300 with an organic amino compound containing up to about 20 carbon atoms, said amino compound being selected from the group consisting of alkyl amines, alkenyl amines, cycloalkyl amines, aryl amines, aralkyl amines, pyridines, triazines, quinolines, guanidines and urea, said amino componds being free of reactive groups other than amino and recovering the resulting reaction product.

2. The product of the process of claim 1.

3. The process of claim 1 wherein the admixing is carried out under substantially anhydrous conditions.

4. The process of claim 1 wherein the magnesia has an iodine adsorption number of from 15 to 220.

5. The process of claim 1 wherein the admixing is carried out at a tempeature between about 65 to 170° C.

6. The process of claim 1 wherein the amino compound is diphenyl guanidine.

7. The process of claim 1 wherein the amino compound is di-o-tolyl guanidine.

8. The process of claim 1 wherein the amino compound is melamine.

9. The process of claim 1 wherein the amino compound is hexamethylene diamine.

10. The process of claim 1 wherein the amino compound is phenylene diamine.

11. A process for preparing an organically modified magnesia containing from about 1 to about 25 percent of organic matter which comprises admixing in a fluidized bed at a temperature between about 0° C. and about 225° C. a lightly calcined magnesia having an iodine adsorption number of from about 10 to about 300 with an organic amino compound containing up to about 20 carbon atoms, said amine being selected from the group consisting of alkyl amines, alkenyl amines, cycloalkyl amines, aryl amines, aralkyl amines, pyridines, triazines, quinolines, guanidines and urea, said amino compounds being free of reactive groups other than amino, and recovering the resulting reaction product.

References Cited by the Examiner

UNITED STATES PATENTS 2,739,075  3/56  Iler _____ 106—308
2,973,282  2/61  Gross _____ 106—288

TOBIAS E. LEVOW, *Primary Examiner.*